3,238,266
PROCESS FOR ALKYLATING AROMATIC HYDRO-
CARBONS USING A SULFONATED RESIN CATA-
LYST
Milan Skripek, Anaheim, Calif., assignor to Richfield Oil
Corporation, Los Angeles, Calif., a corporation of
Delaware
No Drawing. Filed July 16, 1962, Ser. No. 210,243
8 Claims. (Cl. 260—671)

The present invention relates to the alkylation of aromatic compounds and more particularly relates to the alkylation of a mononuclear aromatic compound with tri- and tetra-substituted olefinic hydrocarbons using as a catalyst, an ion-exchange resin having sulfonic acid radicals therein.

Detergent alkylates have been prepared in the prior art by utilizing various strong acid catalysts, particularly sulfuric acid. However, since these acids react with the olefins to form sludge materials which are not readily separated, additional quantities of the acid catalyst must be added from time to time. Sulfonic acid containing ion-exchange resins have also been suggested in the prior art as alkylation catalysts where terminal olefins such as nonenes, decenes, etc. are involved. However, according to the resin catalyzed alkylation practices employed in the prior art, the less reactive tri- and tetra-substituted olefins such as those predominent in the commercial polymerization of propylene and ethylene (for example, propylene trimer, propylene tetramer, and propylene pentamer), have not been successfully employed in producing substantial yields of detergent alkylate.

Sulfonic acid type cation-exchange resins have been utilized in aqueous systems as alkylation catalysts in the prior art. It is postulated that water penetrates the resin and swells the resin to open pores therein so that the reactants can reach the sulfonic acid radicals held within the resins. In nonaqueous, nonpolar systems such as in the alkylation of benzene, the resin pores are not opened by swelling. Consequently, a resin utilized in nonpolar systems must have a structure that is open and with large pores so that the larger reactant molecules can enter the resin structure and be catalyzed by the sulfonic acid radicals held within the resin. Ion-exchange resins with a lower degree of crosslinking generally have a loose or open structure when swollen by polar solvents. Recently a macroreticular ion-exchange resin has been developed which is crosslinked so that the structure is permanently open. Such a resin is described in a paper beginning on page 140 of the Industrial & Engineering Chemistry publication, "Product Research and Development," vol. 1, No. 2, June 1962.

Sulfonic acid type cation-exchange resins such as Amberlite IR–112 or IR–120, Dowex 50W–X2 or 50–X12, and Permutit Q have heretofore been utilized as alkylation catalysts for alkylating relatively reactive olefins such as terminal olefins. However, none of these sulfonic acid type cation-exchange resins have heretofore been found commercially useful in catalyzing the alkylation of benzene with the less reactive olefins such as tri- and tetra-substituted olefins.

It is therefore an object of the present invention to provide a process for alkylating benzene with tri- and tetra-substituted olefins with a sulfonic acid type ion-exchange resin catalyst.

Briefly described, the present invention involves a method for alkylating mononuclear aromatic compounds with tri- and tetra-substituted olefinic hydrocarbons over a highly acidic, sulfonic acid type ion-exchange resin at a relatively high residence time at a relatively high molal ratio of the aromatic to olefins. The expression "tri-substituted and tetra-substituted olefins" is utilized to indicate, respectively, the following formula, where R is an alkyl group and Y is hydrogen or an alkyl group.

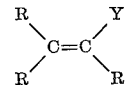

The present invention is particularly adapted to the alkylation of relatively nonreactive polyolefins such as tri- and tetra-substituted olefins, for example, the polymers produced commercially from the polymerization of ethylene and propylene. Due to stearic hindrance the reactivity of such tri- and tetra-substituted olefins is relatively low and consequently the alkylate yield when alkylated with aromatic materials is quite low.

The present invention is particularly useful for ethylene and propylene polymers in the range of $C_6$–$C_{16}$, for example, propylene dimer, trimer, tetramer, and pentamer and ethylene trimer, tetramer, pentamer, hexamer, heptamer, and octamer. These polymerized olefins, due to the manner in which the repeating units, for example, propylene, are united at random in commercial polymerization processes such as the well known phosphoric acid polymerization process, have their double bond at one of several positions in the polymer molecule. In the terminal position the double bond is readily available for reacting with other molecules or atoms, such as benzene, whereas in the di(cis- and trans-), tri-, and tetra-substituted positions, the double bond is progressively less available, and accordingly the compounds are progressively less reactive in alkylation reactions.

Tri- and tetra-substituted olefins are much more prevalent in commercially available polymers than the terminal olefins. As an example, a commercially prepared propylene tetramer fraction having a boiling range of 340–420° F. contained 60% of the tetra-substituted olefin and 30% of the tri-substituted olefin. In another case, a propylene pentamer fraction having a boiling range of 420–500° F., contained 85% tetra-substituted olefin and 10% tri-substituted olefin; hence, a commercially prepared propylene polymer, for example, comprises predominantly tri- and tetra-substituted propylene polymers. Accordingly, these commercial polymers such as propylene trimer and propylene tetramer because they are predominantly tri- and tetra-substituted olefins, are much less reactive than terminal nonene and dodecene, such as 1-nonene and 1-dodecene, respectively. Hence, the commercial importance of the present invention in utilizing commercially available polymers in alkylation reactions is readily apparent.

The process of my present invention may be utilized to alkylate mononuclear aromatic compounds such as benzene, toluene, xylene, etc.; however, the alkylate used as detergent alkylate at the present time is made primarily from benzene and toluene.

It was found that the feed composition was important in producing alkylate. A molal ratio of benzene to olefin of at least 5:1 is necessary for an economic conversion. The optimum or preferred range was found to be between about 7:1 and 20:1, with 20:1 producing the highest yield. Higher feed ratios, although operable in the present invention, involve large expenditures for equipment necessary to handle the excess aromatic compound.

The work performed on the present invention indicates that the residence time of the reactants in the column or reaction chamber is significant. The residence time was measured indirectly by measuring the liquid hourly space velocity (which is the reciprocal of residence time). It was found that the liquid hourly space velocity should be maintained at less than one (volume per volume per hour) and preferably under 0.25, optimally at about 0.125.

The rate of reaction and the yield (conversion of polyolefin) was found to increase with an increase in temperature up to the deactivation temperature of the ion-exchange resin catalyst. The optimum temperature was found to be in the range of 200–300° F. with about 250° F. being preferable from the standpoint of maintaining permanent catalyst activity. Temperatures below 200° F. do not appear to be of commercial importance; however, with adjustment of the other process variables, reasonable yields can be obtained at such lower temperatures.

Preferably peroxides and hydroperoxides should be removed from the olefins before use in the present alkylation process to prevent the catalyst from becoming fouled with high molecular weight oxygen-containing rearrangement products of the peroxides or hydroperoxides. If the catalyst is fouled with oxygen-containing compounds, it may be regenerated by heating at approximately 100° C. with sulfuric acid.

Since the reaction was conducted at relatively high feed ratios of benzene to polyolefins, one of the reactants (benzene) which was present in a large excess, served as the solvent. Where a polar solvent is required as hereinafter set forth, any nonreactive hydrocarbon, for example a nitro or halogenated hydrocarbon, which will dissolve the reactants is suitable.

The catalyst utilized in the present invention may be any sulfonic acid type cation-exchange resin in bead form, with macroreticular structure, which may be produced, for example, by the polymerization of the polystyrene resin in the presence of a liquid in which the monomer is soluble and the polymer insoluble, whereby a separation of the phases occurs during polymerization. Reference is made to French Patent No. 1,205,505 for a description of this phenomenon. Particularly useful in the present invention are the highly crosslinked, strongly acidic, ion-exchange resins of the sulfonated poly(styrene-divinylbenzene) type. These resins have a high concentration of readily accessible hydrogen ions. These catalysts in bead form are strongly acidic resins having a unique porous structure referred to as a macroreticular structure, possessing a high degree of true porosity, rigidity, and minimum volume change when immersed in, or removed from solvents or solutions. The macroreticular structure of these catalysts gives them a high degree of chemical and physical stability in systems destructive to conventional ion-exchange resins. These catalyst materials, however, do tend to decompose at temperatures in excess of 180° C.

EXAMPLE I

A 2:1 molal mixture of benzene to 1-dodecene was heated under reflux with vigorous stirring in the presence of approximately 10 meq. of a highly acidic, highly crosslinked, sulfonated macroreticular ion-exchange resin of the poly(styrene-divinylbenzene) type in bead form. The weight ratio of catalyst to olefin was approximately 1:10. The conversion to monoalkylate based upon the nonene was 37 mol percent. This experiment was repeated using toluene-nonene, toluene-(1-dodcene), benzene-tetrapropylene, and toluene-tetrapropylene with the following molal yields, respectively: 48%, 86%, 0%, and 0%. This example clearly demonstrates the fact that terminal substituted olefins such as nonene and 1-dodecene are sufficiently reactive to be alkylated in the presence of a sulfonic acid type ion-exchange resin, whereas the tetrasubstituted olefin, tetrapropylene, was not reactive under the same reaction conditions.

EXAMPLE II

Propylene tetramer boiling in the range of 340–420° F. was blended with nitration grade benzene at a ratio of 20:1 benzene to tetramer, and passed downwardly through a 1-inch I.D., 10.7-foot long bed reactor filled with 574 grams of ion-exchange resin of Example I. The reactor was kept completely full of liquid. The liquid hourly space velocity was maintained at 0.125 and the mass velocity at 0.5 gallon/minute-feet$^2$. The reaction mixture was maintained at a temperature of 250° F. The products from the reaction were charged to a batch still and topped to 176° C. to remove excess benzene. The concentration of alkylbenzene in the bottoms from the distillation was obtained by infrared analysis and the amount of unreacted benzene and product was determined by gas structure catalyze the alkylation of benzene tri- and chromatography. The yield of detergent alkylate product was 69.7 mol percent of detergent alkylate based on the tetramer in the feed.

EXAMPLES III–XX

The experiment of Example II was repeated using the same propylene tetramer fraction with the feed ratio, liquid hourly space velocity and temperature varied as shown in Table I. The yields obtained by these various runs is shown in Table I.

Table I
DETERGENT ALKYLATE PRODUCTION

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Molal ratio (feed), benzene/olefin [a] | 2:1 | 2:1 | 2:1 | 3:1 | 7:1 | 7:1 | 7:1 | 7:1 | 20:1 | 20:1 | 20:1 | 20:1 | 20:1 | 20:1 | 10:1 | 20:1 | 20:1 | 20:1 | 10:1 | 10:1 | 10:1 |
| LHSV, cc./hr./cc. cat. | 1.7 | 0.8 | 0.8 | 0.75 | 2.0 | 0.5 | 1.0 | 0.25 | 1.0 | 0.5 | 0.33 | 0.25 | 0.2 | 0.125 | 0.125 | 0.125 | 0.125 | 0.25 | 0.125 | 0.25 | 0.25 |
| Mass velocity, gal./min.-ft.$^2$, cc./hr. | 610 | 300 | 300 | 300 | 800 | 200 | 800 | 800 | 340 | 340 | 340 | 340 | 340 | 0.5 | 0.5 | 0.5 | 0.25 | 0.25 | 0.25 | 0.5 | 0.25 |
| Temperature, ° F. | 250 | 250 | 250 | 300 | 250 | 300 | 250 | 250 | 250 | 250 | 250 | 250 | 250 | 250 | 250 | 200 | 250 | 250 | 250 | 200 | 250 |
| Yield, mole percent detergent alkylate/propylene tetramer in feed | 2.1 | 0.9 | 0.8 | 0.4 | 2.5 | | 9.2 | 6.4 | 10.1 | 29.5 | 34.6 | 47.5 | 51.7 | 69.7 | 49.6 | 29.6 | 79.3 | 62.7 | 42.2 | 5.7 | 26.7 |
| Pressure, p.s.i.g. | 100 | 300 | 100 | | 100 | | 100 | 100 | 100 | 100 | 100 | 100 | 100 | 100 | 100 | 100 | 100 | 100 | 100 | 100 | 100 |

[a] Assuming molecular weight of tetramer as 168.

The foregoing examples clearly show that sulfonic acid type ion-exchange resins having macroreticular pore structure catalyze the alkylation of benzene by tri- and tetra-substituted tetrapropylene but that such alkylation is not feasible except at certain feed ratios, temperatures, and residence time. Alkylate yield is shown to increase with temperature, aromatic to olefin ratio in the feed, and residence time.

Although the present invention has been described with a certain degree of particularity, it is to be understood that the present invention is not to be limited to the details set forth but should be given the full scope of the appended claims.

I claim:

1. A process for preparing detergent alkylate comprising reacting a mononuclear aromatic compound selected from the group consisting of benzene and toluene with an olefin feed containing predominantly olefins selected from the group consisting of ethylene and propylene polymers in the $C_6$–$C_{16}$ range having the formula

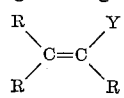

wherein R is an alkyl group and Y is hydrogen or an alkyl group in the presence of an acidic, crosslinked, sulfonated, macroreticular ion-exchange resin at a liquid hourly space velocity of less than one, said reaction mixture having a molal ratio of at least about 5:1 aromatic compound to said olefin feed.

2. The process of claim 1 wherein said reaction is conducted at about 200–300° F.

3. The process of claim 1 wherein said reaction is conducted at about 250° F.

4. The process of claim 1 wherein said molal ratio of aromatic to olefin is about 7:1 to 20:1.

5. The process of claim 1 wherein said liquid hourly space velocity is about 0.125 to 0.25.

6. The process of claim 1 wherein said aromatic compound is benzene.

7. The process of claim 1 wherein said aromatic compound is toluene.

8. A process for preparing detergent alkylate comprising reacting a mononuclear aromatic compound selected from the group consisting of benzene and toluene with a polyolefin selected from the group consisting of propylene trimer, propylene tetramer, and propylene pentamer in the presence of a fixed bed, strongly acidic, highly crosslinked, macroreticular ion-exchange resin of the sulfonated poly(styrene-divinylbenzene) type at a liquid hourly space velocity of about 0.125 at a temperature of about 250° F., said reaction mixture having a molal ratio of at least 7:1 aromatic compound to polyolefin.

References Cited by the Examiner

UNITED STATES PATENTS

| 3,017,441 | 1/1962 | Thomas et al. | 260—671 |
| 3,037,052 | 5/1962 | Bortnick | 260—671 |

PAUL M. COUGHLAN, Primary Examiner.

ALPHONSO D. SULLIVAN, Examiner.